(12) United States Patent
Ruslyakov et al.

(10) Patent No.: US 11,526,403 B1
(45) Date of Patent: Dec. 13, 2022

(54) USING A STORAGE PATH TO FACILITATE DISASTER RECOVERY

(71) Applicants: Alexey A. Ruslyakov, Moscow Region (RU); Maxim V. Lyadvinsky, Moscow (RU); Serguei M. Beloussov, Costa del Sol (SG)

(72) Inventors: Alexey A. Ruslyakov, Moscow Region (RU); Maxim V. Lyadvinsky, Moscow (RU); Serguei M. Beloussov, Costa del Sol (SG)

(73) Assignee: ACRONIS INTERNATIONAL GMBH

( * ) Notice: Subject to any disclaimer, the term of this patent is extended or adjusted under 35 U.S.C. 154(b) by 0 days.

(21) Appl. No.: 14/320,409

(22) Filed: Jun. 30, 2014

Related U.S. Application Data (60) Provisional application No. 61/869,480, filed on Aug. 23, 2013, provisional application No. 61/869,467, filed on Aug. 23, 2013, provisional application No. 61/869,470, filed on Aug. 23, 2013.

(51) Int. Cl.
*G06F 11/00* (2006.01)
*G06F 11/14* (2006.01)
*G06F 9/455* (2018.01)

(52) U.S. Cl.
CPC ...... *G06F 11/1464* (2013.01); *G06F 9/45533* (2013.01)

(58) Field of Classification Search
CPC ............. G06F 11/1456; G06F 11/1458; G06F 11/1464; G06F 11/1469; G06F 9/45533; G06F 9/45562; G06F 9/45587; H04L 63/18

See application file for complete search history.

(56) References Cited

U.S. PATENT DOCUMENTS

| | | |
|---|---|---|
| 7,047,380 B2 | 5/2006 | Tormasov et al. |
| 7,246,211 B1 | 7/2007 | Beloussov et al. |
| 7,275,139 B1 | 9/2007 | Tormasov et al. |
| 7,281,104 B1 | 10/2007 | Tsypliaev et al. |
| 7,318,135 B1 | 1/2008 | Tormasov et al. |
| 7,353,355 B1 | 4/2008 | Tormasov et al. |
| 7,366,859 B2 | 4/2008 | Per et al. |
| 7,475,282 B2 | 1/2009 | Tormasov et al. |
| 7,603,533 B1 | 10/2009 | Tsypliaev et al. |

(Continued)

*Primary Examiner* — Marc Duncan
(74) *Attorney, Agent, or Firm* — K&L Gates LLP (57) ABSTRACT

A method, computer program product, and computing system for using a storage path to facilitate disaster recovery are described. A method may comprise receiving a selection of the storage path to facilitate access to a cloud storage device by the cloud computing client. The method may further comprise configuring the storage path to facilitate access to the cloud storage device by the cloud computing client, wherein the storage path is dedicated to the cloud computing client, and wherein a cloud computing site infrastructure is inaccessible to the cloud computing client via the storage path. The method may also comprise configuring a backup routine to generate a backed-up client resource and transmit the backed-up client resource to the cloud storage device via the storage path. The method may additionally comprise transmitting a list of backed-up client resources stored at the cloud storage device.

15 Claims, 3 Drawing Sheets

(56) References Cited

U.S. PATENT DOCUMENTS

| | | |
|---|---|---|
| 7,636,824 B1 | 12/2009 | Tormasov |
| 7,650,473 B1 | 1/2010 | Tormasov et al. |
| 7,721,138 B1 | 5/2010 | Lyadvinsky et al. |
| 7,779,221 B1 | 8/2010 | Tormasov et al. |
| 7,831,789 B1 | 11/2010 | Tsypliaev et al. |
| 7,886,120 B1 | 2/2011 | Tormasov |
| 7,895,403 B1 | 2/2011 | Tormasov et al. |
| 7,934,064 B1 | 4/2011 | Per et al. |
| 7,937,612 B1 | 5/2011 | Tormasov et al. |
| 7,949,635 B1 | 5/2011 | Korshunov et al. |
| 7,953,948 B1 | 5/2011 | Dyatlov et al. |
| 7,979,690 B1 | 7/2011 | Dyatlov et al. |
| 8,005,797 B1 | 8/2011 | Chepel et al. |
| 8,051,044 B1 | 11/2011 | Dyatlov et al. |
| 8,069,320 B1 | 11/2011 | Per et al. |
| 8,073,815 B1 | 12/2011 | Korshunov et al. |
| 8,074,035 B1 | 12/2011 | Per et al. |
| 8,145,607 B1 | 3/2012 | Korshunov et al. |
| 8,180,984 B1 | 5/2012 | Per et al. |
| 8,225,133 B1 | 7/2012 | Tormasov et al. |
| 8,261,035 B1 | 9/2012 | Tormasov et al. |
| 8,296,264 B1 | 10/2012 | Dyatlov et al. |
| 8,312,259 B1 | 11/2012 | Dyatlov et al. |
| 8,347,137 B1 | 1/2013 | Chepel et al. |
| 8,484,427 B1 | 7/2013 | Lyadvinsky et al. |
| 8,607,054 B2 * | 12/2013 | Ramarathinam ... H04L 63/0807 709/227 |
| 8,645,748 B1 | 2/2014 | Chepel et al. |
| 8,732,121 B1 | 5/2014 | Zorin et al. |
| 8,832,818 B2 * | 9/2014 | Kuehl ................. H04L 63/0209 709/223 |
| 8,856,927 B1 | 10/2014 | Beloussov et al. |
| 8,996,830 B1 | 3/2015 | Lyadvinsky et al. |
| 9,209,979 B2 * | 12/2015 | Spiers ................. H04L 63/0218 |
| 9,235,474 B1 * | 1/2016 | Petri ...................... G06F 11/1417 |
| 9,268,799 B1 * | 2/2016 | Qi ........................... G06F 11/14 |
| 2006/0225065 A1 | 10/2006 | Chandhok et al. |
| 2010/0011178 A1 | 1/2010 | Feathergill |
| 2010/0169497 A1 * | 7/2010 | Klimentiev ............. G06F 9/546 709/228 |
| 2010/0332456 A1 * | 12/2010 | Prahlad ............... G06F 17/3002 707/664 |
| 2011/0161723 A1 * | 6/2011 | Taleck .............. G06F 17/30156 714/4.11 |
| 2011/0173405 A1 * | 7/2011 | Grabarnik ........... G06F 11/1464 711/162 |
| 2012/0173919 A1 * | 7/2012 | Patel .................... G06F 11/1453 714/4.11 |
| 2012/0203877 A1 * | 8/2012 | Bartholomay ...... H04L 63/0227 709/221 |
| 2013/0111260 A1 * | 5/2013 | Reddy ..................... G06F 21/53 714/4.11 |
| 2013/0325809 A1 * | 12/2013 | Kim .................... G06F 11/1451 707/640 |
| 2014/0181046 A1 * | 6/2014 | Pawar ................. G06F 11/1484 707/654 |
| 2015/0095691 A1 * | 4/2015 | Edwards ................ G06Q 10/10 714/4.11 |
| 2015/0193313 A1 * | 7/2015 | Bensinger ........... G06F 11/1451 714/4.11 |

* cited by examiner

USING A STORAGE PATH TO FACILITATE DISASTER RECOVERY

CROSS REFERENCE TO PRIOR APPLICATIONS

This application claims priority to and the benefit of U.S. Provisional Patent Application No. 61/869,470, filed on Aug. 23, 2013; U.S. Provisional Patent Application 61/869467, filed on Aug. 23, 2013; and U.S. Provisional Patent Application No. 61/869480, filed on Aug. 23, 2013, the entire contents of each of which are hereby incorporated by reference. This application is related to, and hereby incorporates by reference in their entireties, the following co-owned patent applications filed on even date herewith by Applicant Acronis International GmBh: United States Patent SApplication entitled "Configuring Backup and Recovery Routines in a Cloud Environment" and having Ser. No. 14/320,393, filed on Jun. 30, 2014; United States Patent Application entitled "Granular Recovery Using Hot-Plug Virtual Disks" and having Ser. No. 14/320,422, filed on Jun. 30, 2014; United States Patent Application entitled "Hot Recovery of Virtual Machines" and having Ser. No. 14/320,450, filed on Jun. 30, 2014; United States Patent Application entitled "Snapshotless Backup" and having Ser. No. 14/320,496, filed on Jun. 30, 2014; United States Patent Application entitled "Recovery of Virtual Machine Files Using Disk Attachment" and having Ser. No. 14/320,510, filed on Jun. 30, 2014; United States Patent Application entitled "Agentless File Backup of a Virtual Machine" and having Ser. No. 14/320,526, filed on Jun. 30, 2014; United States Patent Application entitled "Machine Replication" and having Ser. No. 14/320,540, filed on Jun. 30, 2014; United States Patent Application entitled "Data Backup Parallelization" and having Ser. No. 14/320,546, filed on Jun. 30, 2014; and United States Patent Application entitled "Systems and Methods for Backup of Virtual Machines" and having Ser. No. 14/320,555, filed on Jun. 30, 2014.

TECHNICAL FIELD

The technical field may generally relate to cloud computing, and more particularly to disaster recovery as a service in a cloud environment.

BACKGROUND

A cloud provider may administer a cloud computing site and run a cloud computing platform with multiple tenants, or cloud computing clients. The cloud computing site may administer multiple virtual machines in order to provide cloud services to the tenants. Cloud services may include provisioning applications, data, or other resources to the cloud computing clients. One or more of the tenants may require disaster recovery capability for various applications, data, or other resources existing or running at the cloud computing site.

BRIEF SUMMARY

In an embodiment, a method for using a storage path to facilitate disaster recovery may include receiving, at a cloud computing site from a cloud computing client, a selection of the storage path to facilitate access to a cloud storage device by the cloud computing client. The method may further include configuring, at the cloud computing site, the storage path to facilitate access to the cloud storage device by the cloud computing client, wherein the storage path is dedicated to the cloud computing client, and wherein a cloud computing site infrastructure is inaccessible to the cloud computing client via the storage path. The method may also include configuring, at the cloud computing site, a backup routine to generate a backed-up client resource and transmit the backed-up client resource to the cloud storage device via the storage path. The method may additionally include transmitting, from the cloud computing site to the cloud computing client, a list of backed-up client resources stored at the cloud storage device.

One or more of the following features may be included. The method may include determining, at the cloud computing site, if a new back-up of a client resource exists in the cloud storage device accessible via the dedicated storage path. The method may further include configuring, at the cloud computing site, a cloud agent to perform a back-up conversion in response to determining that a new back-up of a client resource exists. The method may also include configuring, at the cloud computing site, a virtual machine corresponding to a latest back-up of the client resource. The virtual machine corresponding to the latest back-up of the client resource may be provisioned to the cloud computing client through a cloud platform and the virtual machine may be incrementally updated in response to determining that a new back-up of a client resource exists. The storage path may be an exchange share provisioned via the cloud computing site. The exchange share may receive a backup of the client resource to be converted into a stand-by virtual machine.

In an embodiment, a computer program product may reside on a computer readable storage medium and may have a plurality of instructions stored on it. When executed by a processor, the instructions may cause the processor to perform operations for using a storage path to facilitate disaster recovery. The operations may include receiving, at a cloud computing site from a cloud computing client, a selection of the storage path to facilitate access to a cloud storage device by the cloud computing client. The operations may further include configuring, at the cloud computing site, the storage path to facilitate access to the cloud storage device by the cloud computing client, wherein the storage path is dedicated to the cloud computing client, and wherein a cloud computing site infrastructure is inaccessible to the cloud computing client via the storage path. The operations may also include configuring, at the cloud computing site, a backup routine to generate a backed-up client resource and transmit the backed-up client resource to the cloud storage device via the storage path. The operations may additionally include transmitting, from the cloud computing site to the cloud computing client, a list of backed-up client resources stored at the cloud storage device.

One or more of the following features may be included. The operations may include determining, at the cloud computing site, if a new back-up of a client resource exists in the cloud storage device accessible via the dedicated storage path. The operations may also include configuring, at the cloud computing site, a cloud agent to perform a back-up conversion in response to determining that a new back-up of a client resource exists. The operations may additionally include configuring, at the cloud computing site, a virtual machine corresponding to a latest back-up of the client resource. The virtual machine corresponding to the latest back-up of the client resource may be provisioned to the cloud computing client through a cloud platform and the virtual machine may be incrementally updated in response to determining that a new back-up of a client resource exists.

The storage path may be an exchange share provisioned via the cloud computing site. The exchange share may receive a backup of the client resource to be converted into a stand-by virtual machine.

In an embodiment, a computing system for using a storage path to facilitate disaster recovery may include one or more processors. The one or more processors may be configured to receive, at a cloud computing site from a cloud computing client, a selection of the storage path to facilitate access to a cloud storage device by the cloud computing client. The one or more processors may be further configured to configure, at the cloud computing site, the storage path to facilitate access to the cloud storage device by the cloud computing client, wherein the storage path is dedicated to the cloud computing client, and wherein a cloud computing site infrastructure is inaccessible to the cloud computing client via the storage path. The one or more processors may also be configured to configure, at the cloud computing site, a backup routine to generate a backed-up client resource and transmit the backed-up client resource to the cloud storage device via the storage path. The one or more processors may additionally be configured to transmit, from the cloud computing site to the cloud computing client, a list of backed-up client resources stored at the cloud storage device.

One or more of the following features may be included. The one or more processors may be configured to determine, at the cloud computing site, if a new back-up of a client resource exists in the cloud storage device accessible via the dedicated storage path. The one or more processors may further be configured to configure, at the cloud computing site, a cloud agent to perform a back-up conversion in response to determining that a new back-up of a client resource exists. The one or more processors may also be configured to configure, at the cloud computing site, a virtual machine corresponding to a latest back-up of the client resource. The virtual machine corresponding to the latest back-up of the client resource may be provisioned to the cloud computing client through a cloud platform and the virtual machine may be incrementally updated in response to determining that a new back-up of a client resource exists. The storage path may be an exchange share provisioned via the cloud computing site. The exchange share may receive a backup of the client resource to be converted into a stand-by virtual machine.

In an embodiment, a method for using a storage path to facilitate disaster recovery may include receiving, at a cloud computing client from a cloud computing site, a selection of the storage path to facilitate access to a cloud storage device by the cloud computing client; configuring, at the cloud computing site, the storage path to facilitate access to the cloud storage device by the cloud computing client, wherein the storage path is dedicated to the cloud computing client, and wherein a cloud computing site infrastructure is inaccessible to the cloud computing client via the storage path; and configuring, at the cloud computing client, a backup routine to generate a backed-up client resource and transmit the backed-up client resource to the cloud storage device via the storage path.

In one embodiment, the method further includes determining, at the cloud computing site, if a new back-up of a client resource exists in the cloud storage device accessible via the dedicated storage path. In one embodiment, the method further includes configuring, at the cloud computing site, a cloud agent to perform a back-up conversion in response to determining that a new back-up of a client resource exists. In one embodiment, the method further includes configuring, at the cloud computing site, a virtual machine corresponding to a latest back-up of the client resource. In one embodiment, the virtual machine corresponding to the latest back-up of the client resource is provisioned to the cloud computing client through a cloud platform and the virtual machine is incrementally updated in response to determining that a new back-up of a client resource exists. In one embodiment, the method further includes displaying a user interface in communication with the cloud computing client, the user interface responsive to user selections to initiate one of a backup or recovery process.

In one embodiment, the storage path is an exchange share provisioned via the cloud computing site and wherein the exchange share receives a backup of the client resource to be converted into a stand-by virtual machine. In one embodiment, the method further includes transmitting, from the cloud computing site to the cloud computing client, a list of backed-up client resources stored at the cloud storage device.

In an embodiment, a computer program product may reside on a computer readable storage medium and may have a plurality of instructions stored on it. When executed by a processor, the instructions may cause the processor to perform operations for using a storage path to facilitate disaster recovery. The operations may include receiving, at a cloud computing client from a cloud computing site, a selection of the storage path to facilitate access to a cloud storage device by the cloud computing client configuring, at the cloud computing site, the storage path to facilitate access to the cloud storage device by the cloud computing client, wherein the storage path is dedicated to the cloud computing client, and wherein a cloud computing site infrastructure is inaccessible to the cloud computing client via the storage path; and configuring, at the cloud computing client, a backup routine to generate a backed-up client resource and transmit the backed-up client resource to the cloud storage device via the storage path.

In one embodiment, the operations further include determining, at the cloud computing site, if a new back-up of a client resource exists in the cloud storage device accessible via the dedicated storage path. In one embodiment, the operations further include configuring, at the cloud computing site, a cloud agent to perform a back-up conversion in response to determining that a new back-up of a client resource exists.

In one embodiment, the configuration parameter for configuring, at the cloud computing site, a virtual machine corresponding to a latest back-up of the client resource. In one embodiment, the virtual machine corresponding to the latest back-up of the client resource is provisioned to the cloud computing client through a cloud platform and the virtual machine is incrementally updated in response to determining that a new back-up of a client resource exists.

In one embodiment, the storage path is an exchange share provisioned via the cloud computing site and wherein the exchange share receives a backup of the client resource to be converted into a stand-by virtual machine. In one embodiment, the operations further include transmitting, from the cloud computing site to the cloud computing client, a list of backed-up client resources stored at the cloud storage device.

In an embodiment, a computing system for using a storage path to facilitate disaster recovery may include one or more processors. The one or more processors may be configured to receive, at a cloud computing site from a cloud computing client, a selection of the storage path to facilitate access to a cloud storage device by the cloud computing client;

configure, at the cloud computing site, the storage path to facilitate access to the cloud storage device by the cloud computing client, wherein the storage path is dedicated to the cloud computing client, and wherein a cloud computing site infrastructure is inaccessible to the cloud computing client via the storage path; and configure at the cloud computing client, a backup routine to generate a backed-up client resource and transmit the backed-up client resource to the cloud storage device via the storage path.

In one embodiment, the one or more processors are further configured to determine, at the cloud computing site, if a new back-up of a client resource exists in the cloud storage device accessible via the dedicated storage path. In one embodiment, the one or more processors are further configured to configure, at the cloud computing site, a cloud agent to perform a back-up conversion in response to determining that a new back-up of a client resource exists. In one embodiment, the one or more processors are further configured to configure, at the cloud computing site, a virtual machine corresponding to a latest back-up of the client resource. In one embodiment, the virtual machine corresponding to the latest back-up of the client resource is provisioned to the cloud computing client through a cloud platform and the virtual machine is incrementally updated in response to determining that a new back-up of a client resource exists.

In one embodiment, the storage path is an exchange share provisioned via the cloud computing site and wherein the exchange share receives a backup of the client resource to be converted into a stand-by virtual machine. In one embodiment, the one or more processors are further configured to transmit, from the cloud computing site to the cloud computing client, a list of backed-up client resources stored at the cloud storage device.

The details of one or more implementations are set forth in the accompanying drawings and the description below. Other features and advantages will become apparent from the description, the drawings, and the claims.

DETAILED DESCRIPTION

Overview

A cloud provider may have the problem of providing a disaster recovery service without opening access to the cloud provider's internal network and/or infrastructure to the cloud end-user or cloud computing client. Providing the cloud end-user or cloud computing client access to the cloud provider's infrastructure may be a security risk for the cloud provider. Cloud providers may develop their own disaster recovery solutions, which may integrate third party backup and/or replication software with their cloud platform or, may include manual steps into a disaster recovery procedure. For example, a cloud administrator may perform recovery of an image of a cloud end-user's physical and/or virtual server into a hosted virtual machine by the cloud-end user's request. These disaster recovery solutions may not be out-of-the box solutions and may require custom development. Further, these disaster recovery solutions may require the cloud administrator to configure and/or execute a disaster recovery routine.

In view of the forgoing, there may be a need for providing cloud-based disaster recovery as service for physical and virtual resources in multi-tenant cloud environments. Storage (e.g., a storage path) may be used as a secure mechanism of data exchange between sites. The tenants that use such providers can initiate data backup and recovery using methods and systems configured and controlled by the cloud provider using user interfaces and data exchange clients. These interfaces are typically integrated in a client by which the tenant can select and initiate backups and exchange information and control signals and user selections with the cloud service provider including one or more cloud computing sites.

Figure 1:
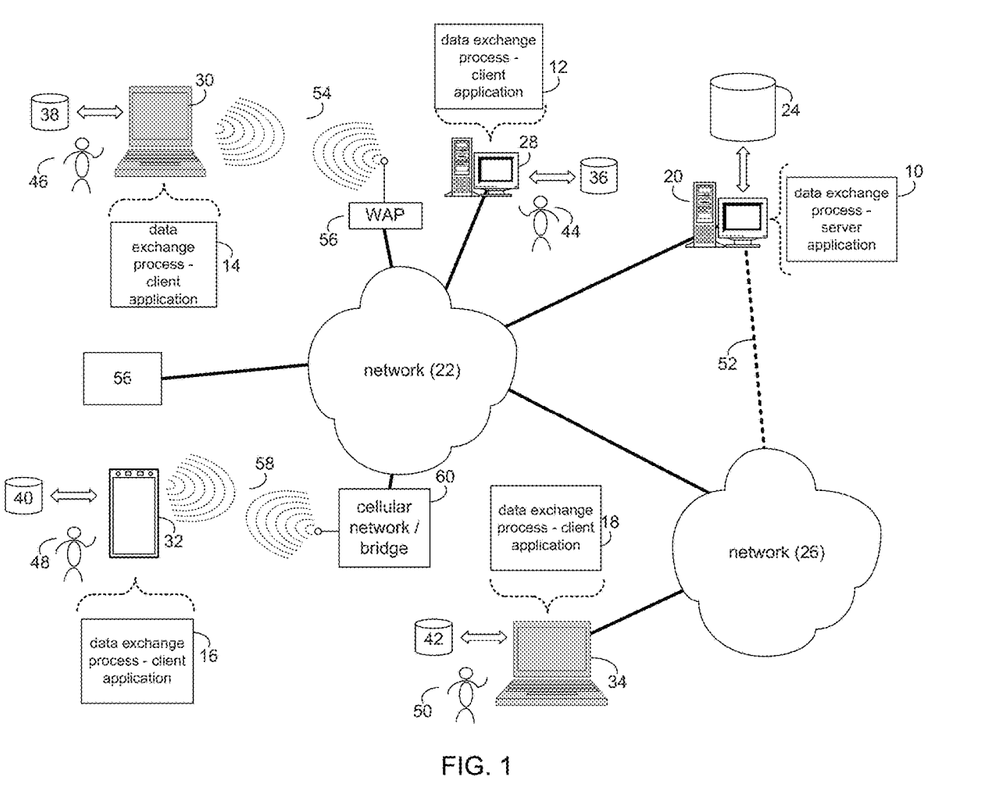
FIG. 1 depicts an example system that can execute implementations of the present disclosure.
Figure 2:
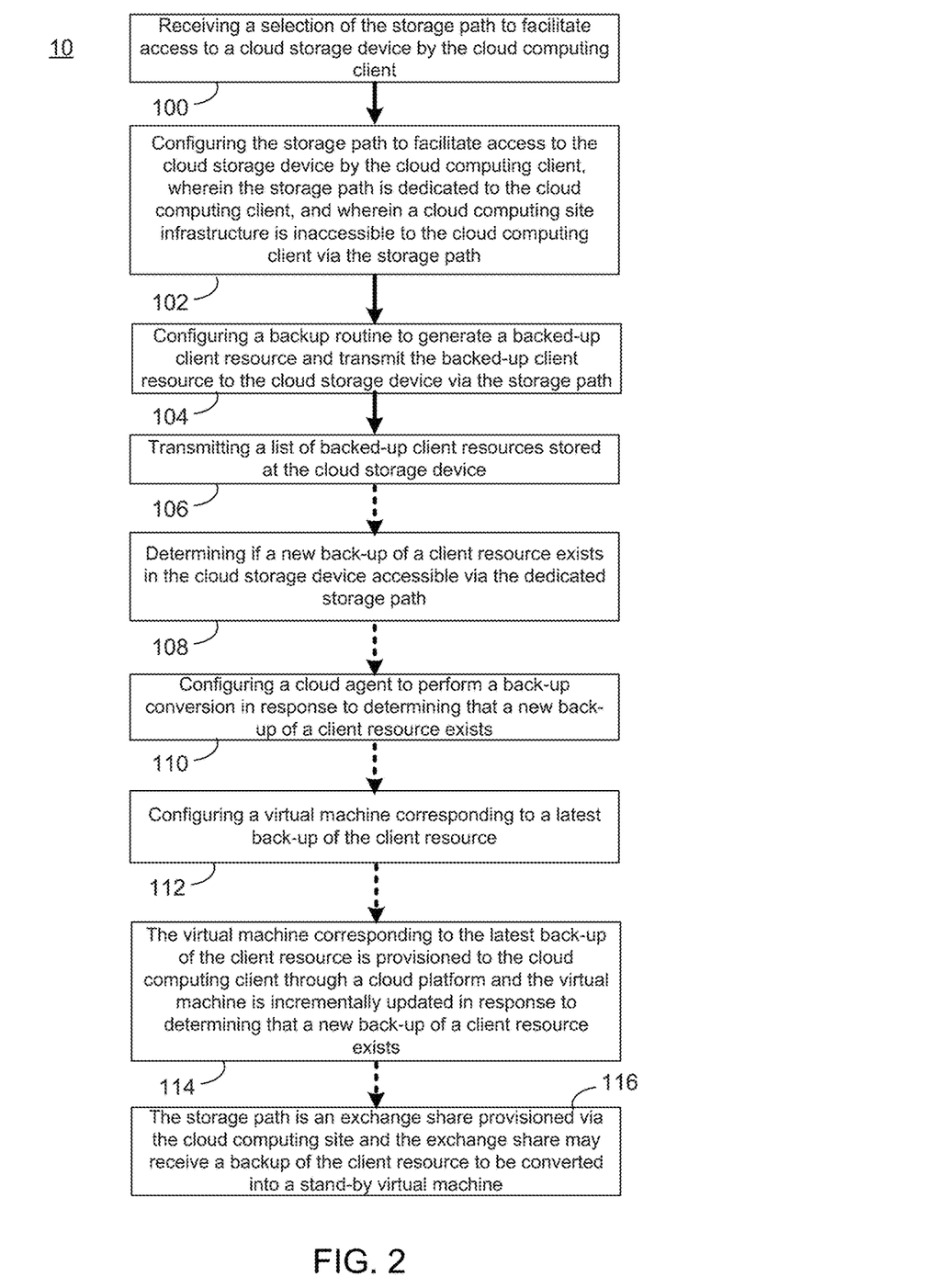
FIG. 2 is a flowchart illustrating an example process for using a storage path to facilitate disaster recovery.

Referring to FIGS. 1 & 2, there is shown a server application 10 and client applications 12, 14, 16, and 18. Server application 10 and/or one or more of client applications 12, 14, 16, and/or 18 may execute one or more processes configured to carry out one or more of the features described herein. Server application 10 may be referred to as a process configured to carry out one or more of the features described herein, such as data exchange process 10. Further, one or more of client applications 12, 14, 16, and 18 may be referred to as a process configured to carry out one or more of the features described herein, such as data exchange processes 12, 14, 16, and/or 18.

As will be discussed below, data exchange process 10 may receive 100 a selection of the storage path to facilitate access to a cloud storage device by the cloud computing client. Data exchange process 10 may also configure 102 the storage path to facilitate access to the cloud storage device by the cloud computing client, wherein the storage path is dedicated to the cloud computing client, and wherein a cloud computing site infrastructure is inaccessible to the cloud computing client via the storage path. Data exchange process 10 may further configure 104 a backup routine to generate a backed-up client resource and transmit the backed-up client resource to the cloud storage device via the storage path. Data exchange process 10 may additionally transmit 106 a list of backed-up client resources stored at the cloud storage device.

Moreover, data exchange process 10 may determine 108 if a new back-up of a client resource exists in the cloud storage device accessible via the dedicated storage path. Data exchange process 10 may further configure 110 a cloud agent to perform a back-up conversion in response to determining that a new back-up of a client resource exists. Data exchange process 10 may also configure 112 a virtual machine corresponding to a latest back-up of the client resource. The virtual machine corresponding to the latest back-up of the client resource may be provisioned (114) to the cloud computing client through a cloud platform and the virtual machine may be incrementally updated in response to determining that a new back-up of a client resource exists.

The data exchange process may be a server-side process (e.g., server-side data exchange process 10), a client-side process (e.g., client-side data exchange process 12, client-side data exchange process 14, client-side data exchange process 16, or client-side data exchange process 18), or a hybrid server-side/client-side process (e.g., a combination of server-side data exchange process 10 and one or more of client-side data exchange processes 12, 14, 16, 18).

System Overview

Referring to FIG. 1, Server-side data exchange process 10 may reside on and may be executed by server computer 20, which may be in communication with network 22 (e.g., the Internet or a local area network). Examples of server computer 20 may include, but are not limited to: a personal computer, a server computer, a series of server computers, a mini computer, and/or a mainframe computer. The server computer 20 may be a distributed system and the operations of server computer 20 may execute on one or more processors, simultaneously and / or serially. For example, server computer 20 may be a symbolic representation of a cloud computing site, cloud environment, or cloud platform running multiple servers, computers, or virtual machines. Server computer 20 may execute one or more operating systems, examples of which may include but are not limited to: Microsoft Windows Server™; Novell Netware™; Redhat Linux™, Unix, or a custom operating system, for example.

The instruction sets and subroutines of server-side data exchange process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application that allows for access to server computer 20 (via network 22) using one or more protocols, examples of which may include but are not limited to HTTP (i.e., HyperText Transfer Protocol). Network 22 may be in communication with one or more secondary networks (e.g., network 26), examples of which may include but are not limited to: a local area network; a wide area network; or an intranet, for example.

Client-side data exchange processes 12, 14, 16, 18 may reside on and may be executed by client electronic devices 28, 30, 32, and/or 34 (respectively), examples of which may include but are not limited to personal computer 28, a television with one or more processors embedded therein or coupled thereto (not shown), laptop computer 30, data-enabled mobile telephone 32, notebook computer 34, a tablet (not shown), and a personal digital assistant (not shown), for example. Client electronic devices 28, 30, 32, and/or 34 may each be in communication with network 22 and/or network 26 and may each execute an operating system, examples of which may include but are not limited to Apple iOS™, Microsoft Windows™, Android™, Redhat Linux™, or a custom operating system.

The instruction sets and subroutines of client-side data exchange processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Client-side data exchange processes 12, 14, 16, 18 and/or server-side data exchange process 10 may be processes that run within (i.e., are part of) a cloud computing site, cloud computing application, cloud platform, or cloud environment. Alternatively, client-side data exchange processes 12, 14, 16, 18 and/or server-side data exchange process 10 may be stand-alone applications that work in conjunction with the cloud computing site, cloud computing application, cloud platform, or cloud environment. One or more of client-side data exchange processes 12, 14, 16, 18 and server-side data exchange process 10 may interface with each other (via network 22 and/or network 26).

Users 44, 46, 48, 50 may access server-side data exchange process 10 directly through the device on which the client-side data exchange process (e.g., client-side data exchange processes 12, 14, 16, 18) is executed, namely client electronic devices 28, 30, 32, 34, for example. Users 44, 46, 48, 50 may access server-side data exchange process 10 directly through network 22 and/or through secondary network 26. Further, server computer 20 (i.e., the computer that executes server-side data exchange process 10) may be in communication with network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing a wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and personal digital assistants to be interconnected using a short-range wireless connection.

Data Exchange Process

For the following discussion, server-side data exchange process 10 will be described for illustrative purposes and server computer 20 will serve as a representation of a cloud computing site and be referred to as cloud computing site 20 which includes multiple server computers. It should be noted that server-side data exchange process 10 may interact with client-side data exchange process 12 and may be executed within one or more applications that allow for communication with client-side data exchange process 12. However, this is not intended to be a limitation of this disclosure, as other configurations are possible (e.g., stand-alone, client-side data exchange processes and/or stand-alone server-side data exchange processes). For example, some implementations may include one or more of client-side data exchange processes 12, 14, 16, 18 in place of or in addition to server-side data exchange process 10.

Referring now to FIG. 1 one or more of users 44, 46, 48, and 50 may be cloud administrators at a cloud provider or may be cloud end-users. While a user, such as a tenant or cloud user may be isolated from a cloud provider's infrastructure such a user can manage backups such as through a user interface. In this way, a user, whether a provider of cloud services or a tenant or other user may initiate backup such as self service back ups in the case of a tenant using a client interface. Remote backups by a user can be performed by information being exchanged between a client such as a cloud computing client and a cloud computing site. The cloud computing site can include one or more processors, servers, data storage, and other cloud computing devices alone or in combination. Selections and information about the cloud computing site may be displayed to and actionable by a user via such a data exchange client, such as for example a cloud computing client. This information allows backups and other actions to be performed using software such as backup agents and others in communication with such a client and a cloud computing site.

The cloud administrators may access and administer cloud computing site 20 and the cloud-end users may access and interact with cloud computing site 20 through one or more of client electronic devices 28, 30, 32, 34 (respectively). Cloud computing site 20 may run a cloud or virtualization application such as VMware™ or may include bare-metal embedded hypervisors (e.g., VMware™ ESX™ and VMware™ ESXi™) that may run directly on server hardware at cloud computing site 20. Further, cloud computing site 20 may include a vCloud™ architecture that may enhance cooperation between hypervisors. Data exchange process 10 may run at cloud computing site 20 and may include any number of the techniques or features described herein.

Figure 3:
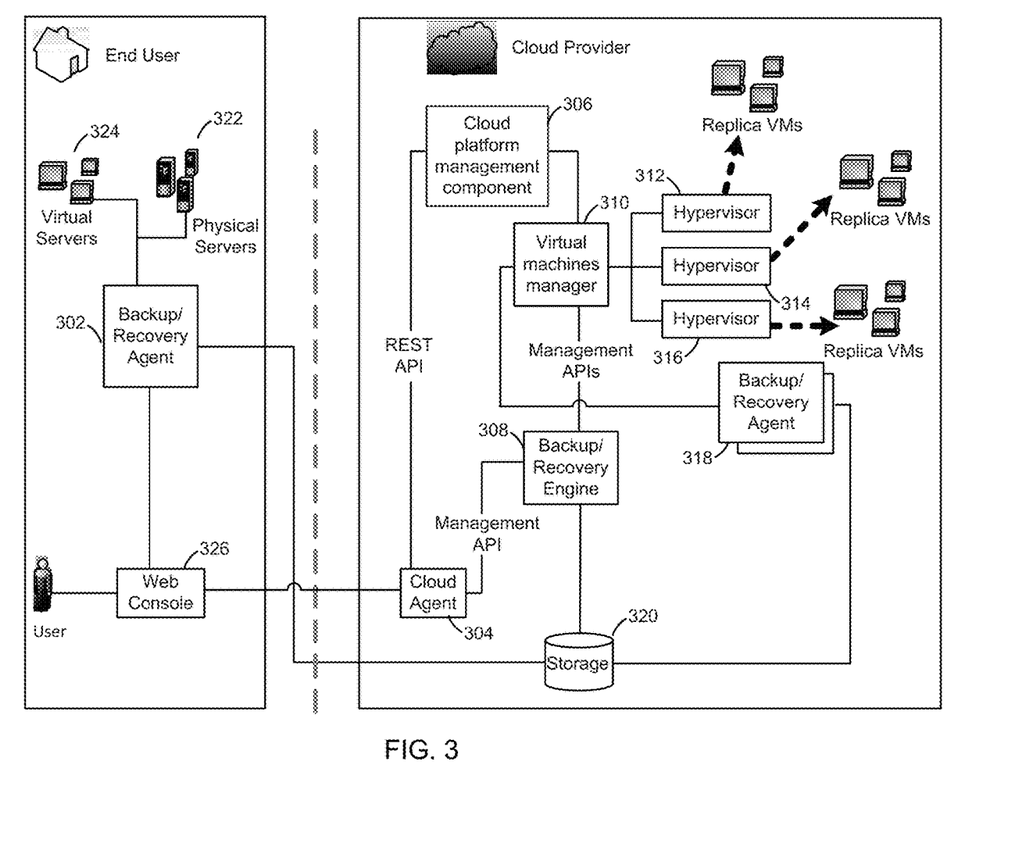
FIG. 3 depicts an example infrastructure in accordance with the present disclosure.

Referring now to FIG. 3, backup/recovery agent 302 on a cloud end-user's side may be deployed to perform backups of one or more systems requiring protection. Cloud agent component 304 may be integrated with a cloud platform management component 306 through an API (e.g., REST API) provided by cloud platform vendor. Cloud agent 304 may be in communication with backup/recovery engine 308, which may provide an API for virtual machine recovery. Backup/recovery engine 308 may be integrated with virtual machines manager component 310.

Further, virtual machines manager component 310 may provide centralized management for hypervisors 312, 314, or 316 which may host virtual machines. Backup/recovery engine 308 may provide recovery capabilities for virtual machines hosted on hypervisors 312, 314, or 316 through backup/recovery agent 302. A storage path may be configured by the cloud provider, and may allow access to a particular cloud end-user with personal credentials.

Cloud agent 304 may include a web part (e.g., a web server and web user interface code) and a server part (e.g., business logic). Backup/recovery engine 308 may be a service which may deploy and manage backup/recovery agent 318 and may accumulate information provided by these agents. Backup/recovery agent 318 may execute backup/recovery routines.

In an implementation, Acronis Online Backup protocol may be used to transfer data blocks between the cloud end-user and the cloud provider over WAN without establishing VPN connection or using FTP protocol. Further, in an implementation, backup storage can be managed by an Acronis Storage Node component capable of doing deduplication.

In an implementation, cloud agent 304 may be a vCloud™Agent and may be integrated with a cloud platform through a REST API, which may be VMware™ REST API. The cloud platform may be VMware™ vCloud Director™. Cloud agent 304 may also be in communication with backup engine 308 through a management API, which may be provided by backup engine 308. Backup engine 308 may be integrated virtual machines manager 310, which may be a VMware™ vCenter™ server. Virtual machines manager 310 may provide centralized management for hypervisors 312, 314, and 316, which may be VMware™ ESXi™ hosts hosting virtual machines. Backup engine 308 may provide backup and recovery capability for virtual machines hosted on hypervisors 312, 314, and 316.

A system administrator on cloud provider's side may create an organization unit for a cloud computing client in a cloud platform (e.g., VMware™ vCloud Director™). The system administrator may enable disaster recovery for the organization in cloud agent 304 (e.g., vCloud Agent). When disaster recovery is enabled for an organization in cloud agent 304, a storage path may be automatically set for the organization based on storage 320, which may be specified when disaster recovery is enabled.

Continuing with the example above, and referring now also to FIG. 2, data exchange process 10 may receive 100 a selection of the storage path to facilitate access to a cloud storage device by the cloud computing client. Further, data exchange process 10 may configure 102 the storage path to facilitate access to the cloud storage device by the cloud computing client. The storage path may be dedicated to the cloud computing client, and the cloud computing site infrastructure may be inaccessible to the cloud computing client via the storage path. Backup/recovery agent 318 may be in communication with the storage path dedicated for the cloud computing client's organization. Credentials may be provided to a cloud end-user by the cloud administrator.

Data exchange process 10 may configure 104 a backup routine to generate a backed-up client resource and may transmit the backed-up client resource to the cloud storage device (e.g., storage 320) via the storage path. For example, backup/recovery agent 318 may configure a backup routine for local physical resources 322 or virtual resources 324 to storage 320 (which may be located at the cloud provider's side) over WAN/LAN. Backup transport may be performed over NFS/SMB/iSCSI if a VPN connection is established between two sites or over an online backup protocol which may not require a VPN connection.

Further, the cloud end-user may authenticate in cloud agent 304 using a web console 326 with cloud platform management component 306 (e.g., vCloud Director) credentials. Data exchange process 10 may transmit 106 a list of backed-up client resources stored at the cloud storage device (e.g., storage 320). For example, the cloud end-user may obtain a list of protected physical/virtual resources with their versions, stored in the storage path specified by the cloud administrator for the corresponding organization.

Data exchange process 10 may determine 108 if a new back-up of a client resource exists in the cloud storage device (e.g., storage device 320) accessible via the dedicated storage path. Cloud agent 304 may be configured to perform backup conversion to a virtual machine for a particular resource each time a new backup appears in a specified storage path for the resource. For example, data exchange process 10 may configure 110 a cloud agent (e.g., cloud agent 304) to perform a back-up conversion in response to determining that a new back-up of a client resource exists.

Target virtual applications that include converted virtual machines may be configured in a way to support failover. For example, network interfaces, virtual switches, and virtual machine start order may be configured to replicate the original user's network. Backup/recovery engine 308 may create a conversion task which may be triggered by appearance of a new backup for a protected resource (e.g., 322 and 324).

Backup/recovery engine 308 may interact with a vSphere/vCloud infrastructure. Backup/recovery engine 308 may send a conversion task to backup/recovery agent 318. Data exchange process 10 may configure 112 a virtual machine corresponding to a latest back-up of the client resource. For example, backup/recovery agent 318 may create a virtual machine in virtual machines manager 310 (e.g., vCenter Server) using virtual machine API calls and may configure a virtual machine to correspond to the protected resource. Backup/recovery agent 318 may execute the conversion of the backup to a replica virtual machine which may be run by hypervisor 312, 314, or 316. The created (replica) virtual machine which may be run by hypervisor 312, 314, or 316 may be registered in cloud agent 304. The virtual machine corresponding to the latest back-up of the client (protected) resource may be provisioned (114) to the cloud computing client through the cloud platform and the virtual machine may be incrementally updated in response to determining that a new back-up of a client resource exists.

In an implementation, a cloud end-user may configure backup/recovery agent 318 to create an image of the user's on-premise physical or virtual machine either on schedule or on demand, and may specify a set of backup options and a destination storage path that the received from the cloud service provider. When creating an image, backup/recovery agent 318 may invoke a snapshot of a physical or virtual machine to provide data consistency within a backup and may write data blocks into a backup file, located in a storage path and configured as backup destination.

In an implementation, cloud agent 304 may pass some or all configured storage paths to backup/recovery engine 308 located on the cloud provider's side. Backup/recovery Engine 308 may be configured to monitor storage paths of some or all cloud end-users and acknowledge if a new backup appears in any of these storage paths. Once backup/recovery engine 308 detects a new backup in any of storage paths, it may create a conversion task and may send it backup/recovery agents 318 located on the cloud provider's side. Backup/recovery agent 318 may execute the conversion task, and may perform a recovery of a backup image into a virtual machine. Every next backup conversion to this virtual machine may lead to applying changes from this latest backup to this virtual machine.

Cloud agent 304 may acknowledge that a new virtual machine which may be run by hypervisor 312, 314, or 316 was created and may register the new virtual machine in cloud platform management component 306 (e.g., vCloud Director). The new virtual machine may be registered for a particular user/organization for which the storage path with storage device 320 was created in a virtual application provided by the user during configuration.

In an implementation, a failover process may be manual or automated by a cloud end-user. Replica virtual machines may be backed up, by a cloud end-user using cloud agent 304, to the storage path provided for a particular organization. Cloud agent 304 may transfer a backup request to backup/recovery engine 308. Backup/recovery engine 308 may create a backup task and may transfer the backup task to backup/recovery agent 318. Backup/recovery agent 318 may store backups in the storage path provided for the user's organization (e.g., at storage 320). Replica virtual machines may be powered off. Backups of replica virtual machines may be recovered to a primary site using backup/recovery agent 318.

Data exchange process 10 may use a storage path as a data exchange point between a cloud end-user and service provider's cloud infrastructure. For example, a cloud end-user may have an on-premise physical server and may want to have a stand-by copy of this server in provider's cloud. To copy the physical server to a virtual machine, running in the cloud, the cloud end-user generally needs to get access to a server hosting virtual machines on a cloud provider's side and upload a copy of the user's on-premise resource to this provider's server. The provider may not give the cloud end-user access credentials to the provider's server, because this server may also include virtual machines of other cloud end-users. Allowing such access to anyone may be a security threat.

To avoid such security threats, providers may use cloud platforms (like VMware vCloud Director). In the present disclosure, the cloud end-user and service provider may use a storage path as an exchange share provisioned (116) by the service provider via the cloud computing site and wherein the exchange share receives a backup of the client resource to be converted into a stand-by virtual machine. For example, the cloud end-user may transmit an image (backup) of the user's on-premise resource to this exchange share, and software (by, e.g., Acronis) on provider's side may automatically convert every new backup of the on-premise resource into a stand-by virtual machine, provisioned to a tenant via a cloud platform (like vCloud Director). In other words, every new backup of a cloud end-user's resource may lead to an automatic incremental change in a resultant stand-by virtual machine provisioned to a cloud end-user through a cloud platform.

One or more of the techniques and features described herein may be included in a software application such as, for example, an advanced backup software including but not limited to Acronis Backup Advance. The software application may be configured to provide one or more of image backup for live machines, bare-metal restore on different hardware, migration between different hypervisors and physical machines, and VMware ESXi hypervisor backup and BMR Virtualization may be standard for smaller environments. New servers may be virtual by default. Virtualization may bring lower costs, fewer servers, higher resource utilization, application isolation and lower license costs.

Small environments may have specific needs for a backup solution such as a complete, efficient, and easy-to-use solution. A typical environment may include an active directory, a file server, exchange servers (2), SharePoints (2), SQL-based LOB apps (2), and accounting systems (1).

Virtualization may enable better backup (hypervisor-lever backup, no agent installation required inside a virtual machine, less CPU/RAM consumption, easy and unified management, recover to virtual and physical hosts, cold stand-by replica with very low resource consumption). Free tools may include inefficient technology or license limitations that make them slow, unreliable or limited. Advanced solutions may include multi-hypervisor support, too complex features, and extensive scalability which may lead to over-complexity and high cost.

Advanced backup software may include components for managed machines such as agents, which may be applications that perform data backup, recovery and other operations on the machines managed. Agents may require a license to perform operations on each managed machine. The advanced backup software may further include one or more components for centralized management. The advanced backup software may also include a console, which may provide one or more graphical user interfaces to other advanced backup software components. The advanced backup software may additionally include a bootable media builder through which bootable media may be created to facilitate use of the agents and other utilities in a rescue environment. The one or more agents may enable disk level and file-level protection for systems running Windows™, Linux™, VMware™, Hyper-V™, Exchange™, and/or SQL™ software applications.

The advanced backup software may expand backup and recovery capabilities in physical, virtual, and cloud environments. For example, the advanced backup software may provide express full backup functionality, which may be based on monitoring changes of database files. Once an initial full backup is taken, all subsequent backups may only back up changes to a database without needing to read the entire database file. Combining this method with data deduplication functionality may make it possible to back up large databases of 1TB or more during business hours and even over WANs. The advanced backup software may also provide database clustering support. A user may choose to backup up database replicas rather than active databases for minimal production impact. The advanced backup software may additionally provide continuous data protection, which may allow for reverting database data to almost any point in time. If the most recent transaction log file survived, a user may revert the database data to the point of failure.

In an implementation, the resources provisioned to the authenticated cloud computing client are provisioned through a cloud platform associated with the cloud computing site and are accessible only through the cloud platform.

Example Software and Hardware Related Implementations

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Various embodiments of the systems and methods may include and/or utilize a computer device. In various embodiments, a computer may be in communication with a server or server system utilizing any suitable type of communication including, for example, wired or wireless digital communications. In some embodiments, the server or server system may be implemented as a cloud computing application and/or in a similar manner and may provide various functionality of the systems and methods as SaaS.

The examples presented herein are intended to illustrate potential and specific implementations of the present invention. The examples are intended primarily for purposes of illustration of the invention for those skilled in the art. No particular aspect or aspects of the examples are necessarily intended to limit the scope of the present invention.

The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present invention, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," "computer device," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "agent," "server," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, or HTML using, for example, conventional or object-oriented techniques. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. As the systems and methods described herein aim to minimize I/O transactions, they may be useful in situations, such as cloud computing configurations, where I/O transactions are performed over a WAN or other network with long I/O delays. The network may use routers and/or public communication links. One type of data communication network may cover a relatively broad geographic area (e.g., city-to-city or country-to-country) which uses transmission facilities provided by common carriers, such as telephone service providers.

In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or inter-network generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier or other data location information as described herein). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java).

Also, application servers may be provided in accordance with the .NET framework, including the Windows Communication Foundation, .NET Remoting, ADO.NET, and ASP-.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the disclosure can be realized as one or more computer program products, i.e., one or more modules of computer program instructions encoded on a computer readable medium for execution by, or to control the operation of, a data processing apparatus. The computer readable medium can be a machine-readable storage device, a machine readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions or computer program products and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These may also be referred to as computer readable storage media. The processor and the memory can be supplemented by, or incorporated in, special purpose logic circuitry.

To provide for interaction with a user, implementations of described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While various embodiments have been described herein, it should be apparent, however, that various modifications, alterations and adaptations to those embodiments may occur to persons skilled in the art with the attainment of some or all of the advantages of the invention. The disclosed embodiments are therefore intended to include all such modifications, alterations and adaptations without departing from the scope and spirit of the invention. Accordingly, other embodiments and implementations are within the scope of the following claims. For example, the actions recited in the claims can be performed in a different order and still achieve desirable results.

What is claimed is:

1. A method for using a storage path to facilitate disaster recovery, the method comprising:
    enabling disaster recovery for a cloud computing client of a cloud platform provider using a cloud agent of the cloud platform provider, wherein the cloud computing client has one or more protected resources, wherein the one or more protected resources comprise physical or virtual resources, wherein one or more of the virtual resources are one or more virtual machines that are provisioned to the cloud computing client through the cloud provider platform, wherein the cloud platform is a multi-tenant environment having a plurality of tenants, wherein the cloud computing client is accessible to select and initiate backups by the plurality of tenants and the cloud platform provider;
    receiving, at a cloud computing client from a cloud computing site of the cloud platform provider, a selection of the storage path to facilitate access to a cloud storage device by the cloud computing client when the cloud storage device is specified during the enabling of disaster recovery, wherein infrastructure of the cloud platform provider is inaccessible to the cloud computing client via the storage path, wherein the storage path is dedicated to the cloud computing client;
    configuring, at the cloud computing site, the cloud agent to perform backup conversion to a virtual machine for the one or more protected resources each time a new backup appears in the storage path of the cloud storage device for the one or more protected resources;
    configuring using backup/recovery agent, at the cloud computing client, a backup routine to generate a backed-up client resource of the one or more protected resources and transmit the backed-up client resource to the cloud storage device via the storage path; and
    transmitting the backed-up client resource via the storage path.

2. The method of claim 1, further comprising:
    determining, at the cloud computing site, if a new back-up of a client resource exists in the cloud storage device accessible via the dedicated storage path.

3. The method of claim 2, further comprising:
    configuring, at the cloud computing site, a virtual machine corresponding to a latest back-up of the one or more protected resources.

4. The method of claim 3, wherein the virtual machine corresponding to the latest back-up of the client resource is provisioned to the cloud computing client through a cloud platform and the virtual machine is incrementally updated in response to determining that a new back-up of a client resource exists.

5. The method of claim 1, wherein the storage path is an exchange share provisioned via the cloud computing site and wherein the exchange share receives a backup of the client resource to be converted into a stand-by virtual machine.

6. The method of claim 1 further comprising displaying a user interface in communication with the cloud computing client, the user interface responsive to user selections to initiate one of a backup or recovery process.

7. The method of claim 1 further comprising transmitting, from the cloud computing site to the cloud computing client, a list of backed-up client resources stored at the cloud storage device.

8. The computing system of claim 1, wherein a cloud end-user may authenticate in a cloud agent using a web console with a cloud platform management component.

9. A computing system for using a storage path to facilitate disaster recovery, the computing system comprising one or more processors, wherein the one or more processors are configured to:
enable disaster recovery for a cloud computing client of a cloud platform provider using a cloud agent of the cloud platform provider, wherein the cloud computing client has one or more protected resources, wherein the one or more protected resources comprise one or more virtual resources, wherein one or more of the virtual resources are one or more virtual machines that are provisioned to the cloud computing client through a cloud platform of the cloud platform provider,. wherein the cloud platform is a multi-tenant environment having a plurality of tenants, wherein the cloud computing client is accessible to select and initiate backups by the plurality of tenants and the cloud platform provider;
receive, at a cloud computing client from a cloud computing site of the cloud platform provider, a selection of the storage path to facilitate access to a cloud storage device by the cloud computing client, when the cloud storage device is specified during the enabling of disaster recovery, wherein infrastructure of the cloud platform provider is inaccessible to the cloud computing client via the storage path, wherein the storage path is dedicated to the cloud computing client;
configuring, at the cloud computing site, the cloud agent to perform backup conversion to a virtual machine for the one or more protected resources each time a new backup appears in the storage path of the cloud storage device for the one or more protected resources;
configure using backup/recovery agent at the cloud computing client, a backup routine to generate a backed-up client resource of the one or more protected resources and transmit the backed-up client resource to the cloud storage device via the storage path;
receive, at the storage path, a backup of the client resource;
transmit the backed-up client resource to the cloud storage device and store the same using the cloud storage device; and
automatically convert every new backup of the one or more virtual resources into a stand-by virtual machine, provisioned via the cloud computing site of the cloud platform provider.

10. The method of claim 9, wherein the one or more processors are further configured to:
configure, at the cloud computing site, a cloud agent to perform a back-up conversion in response to determining that a new back-up of a client resource exists.

11. The computing system of claim 9, wherein the one or more processors are further configured to:
configure, at the cloud computing site, a virtual machine corresponding to a latest back-up of the client resource.

12. The computing system of claim 9, wherein the virtual machine corresponding to the latest back-up of the client resource is provisioned to the cloud computing client through the cloud platform and the virtual machine is incrementally updated in response to determining that a new back-up of a client resource exists.

13. The computing system of claim 9, wherein the storage path is an exchange share provisioned via the cloud computing site and wherein the exchange share receives a backup of the client resource to be converted into a stand-by virtual machine.

14. The computing system of claim 9, wherein the one or more processors are further configured to:
transmit, from the cloud computing site to the cloud computing client, a list of backed-up client resources stored at the cloud storage device.

15. The computing system of claim 9, wherein a cloud end-user may authenticate in a cloud agent using a web console with a cloud platform management component.

* * * * *